May 29, 1951  A. W. MILLER  2,554,585
COUPLING

Filed Jan. 27, 1949  2 Sheets—Sheet 1

INVENTOR.
ALBERT W. MILLER
BY
*Bartlett ...*
ATTORNEYS.

May 29, 1951     A. W. MILLER     2,554,585
COUPLING
Filed Jan. 27, 1949     2 Sheets-Sheet 2
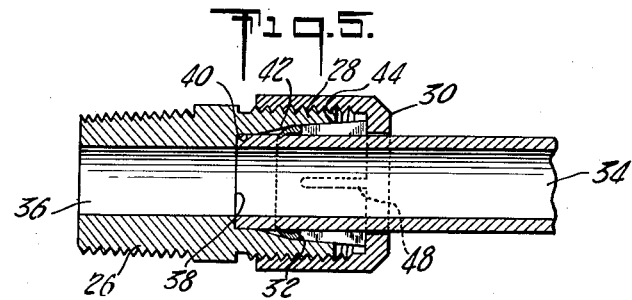
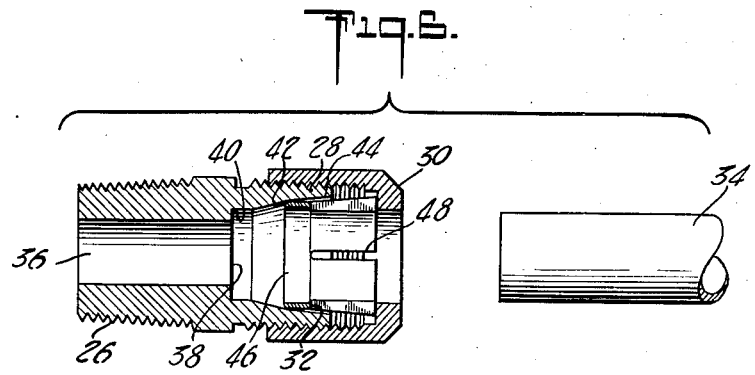
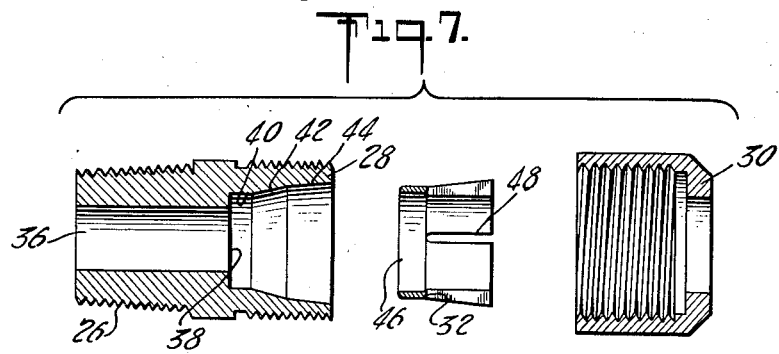
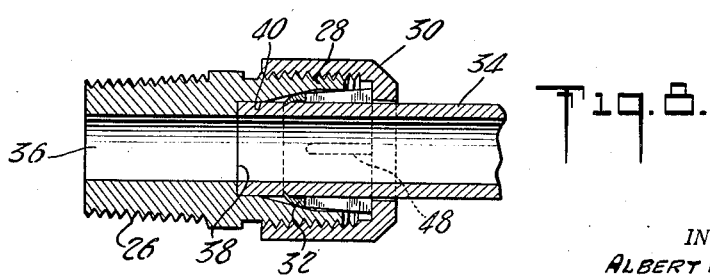
INVENTOR.
ALBERT W. MILLER
BY
ATTORNEYS.

Patented May 29, 1951

2,554,585

UNITED STATES PATENT OFFICE 2,554,585

COUPLING

Albert W. Miller, Jamaica, N. Y.

Application January 27, 1949, Serial No. 73,053

9 Claims. (Cl. 285—122)

The present invention relates to couplings, and has special reference to couplings for tubes, pipes and other elongated members.

The principal object of the invention is to provide a coupling of this character which is of simple and strong construction, which may be easily applied and detached, and in which a firm leak-proof joint is provided without weakening or otherwise damaging the tube in the coupling, and the tube is effectively protected against fatigue and breakage in service.

The several features of the invention, whereby this and other objects may be attained, will be readily understood from the following description and accompanying drawings, in which:

Fig. 5 is a view corresponding to Fig. 1 of another modified form;

Figs. 6 and 7 are views corresponding to Figs. 2 and 3 respectively of the latter modified form; and Fig. 8 is a modification of the form shown in Fig. 5.

Figure 1:
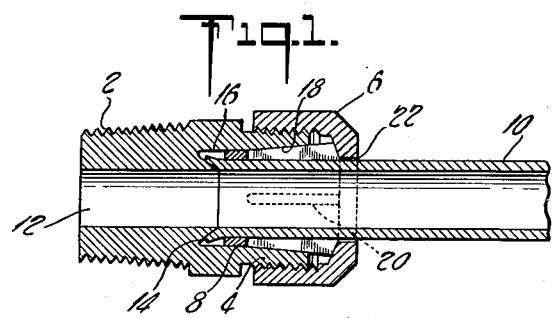
Figure 1 is a longitudinal sectional view of one form of the coupling shown applied to the end portion of a tube.
Figure 2:
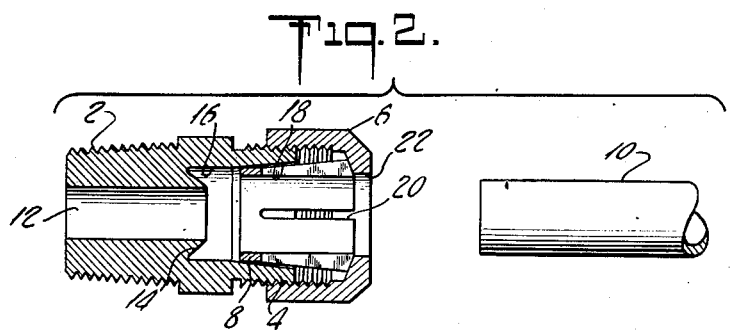
Fig. 2 is a corresponding view of the coupling with the parts assembled ready to receive the end portion of the tube, the tube being shown in elevation.
Figure 3:
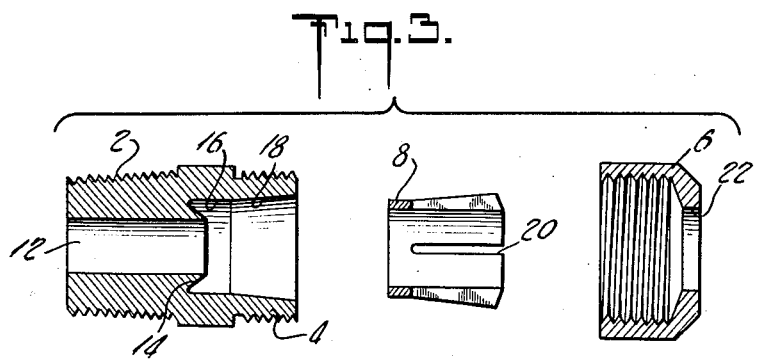
Fig. 3 is a corresponding view, but with the parts separated.

The coupling shown in Figs. 1, 2 and 3 comprises a body member having a sleeve 4 formed on one end, a clamping nut 6 screw-threaded to the end of the sleeve, and a contractible longitudinally slotted collar 8, Fig. 1 showing the coupling assembled and fastened to the end portion of a tube 10.

The end portion of the body member opposite the sleeve 4 is provided with an axial bore 12 of substantially the same diameter as the internal diameter of the tube 10. At the inner end of the bore 12 there is a tube end fitting 14 in the form of a conical nipple. The interior surface of the sleeve 4 has a cylindrical inner end portion 16, and the remaining portion 18 thereof flares outwardly.

The inner end portion of the collar 8 has an exterior surface of slightly greater diameter than the interior diameter of the end portion 16 of the sleeve. The remaining outer portion of the collar 8 is provided with longitudinal slots 20, the collar illustrated having four such slots, three of them being shown in the drawings. The exterior surface of this outer portion of the collar 8 is tapered inwardly.

The clamping nut 6 is provided with an end wall having an axial bore 22, and the outer end of the collar 8 and the co-engaging portion of the end wall of the clamping nut are beveled.

With the parts assembled as shown in Fig. 2, the end portion of the tube 10 may be inserted through the nut aperture 6 and collar 8 with its end abutting the tube end fitting 14. The diameter of the outer end of this fitting may be slightly less than the inner diameter of the tube 10.

Upon tightening the clamping nut 6, the end wall thereof by engagement with the outer end of the collar 8 urges the collar inwardly so as to cause its inner end to be forced into the cylindrical portion 16 of the sleeve 4, thus contracting said end of the collar to cause it to tightly grip the tube. During this movement of the collar the outer beveled end thereof through its engagement with the beveled portion of the end wall of the nut 6, causes the longitudinally slotted portion of the collar to be contracted about the tube. Upon the further tightening of the clamping nut 6, the tube 10 is forced inwardly with the collar so as to cause the inner end of the tube to be flared tightly around the conical fitting 14. The further inward movement of the collar is then limited by the engagement of its exteriorly tapered portion with the interior surface of the sleeve 4, and during such final tightening of the clamping nut the outer split portion of the contractible collar is caused to grip the tube with greater firmness. Thus the collar throughout its length grips the tube, but with the pressure decreasing from the inner to the outer end of the collar.

The coupling components are assembled when manufactured and need not be disassembled before being installed. When the tube has been inserted, as the clamping nut is tightened, the collar 8 first grips the tube and then both the tube and the collar move inwardly forcing the end of the tube to flare tightly around the conical fitting which acts as a spreading die to form an endurable leak-proof joint. As the nut is further tightened after the tube has been flared to a predetermined extent, the tapered surface of the collar which at this point has become embraced by the interior wall of the sleeve 4, checks the inward longitudinal movement of the collar and imposes through the laterally contractible slotted portion of the collar an added radial pressure over a considerable area of the neck of the tube adjacent to the flared portion, such pressure gradually diminishing in an outward direction. This spreading and variable clamping force dampens and distributes vibrations and thereby protects the tube against fatigue and breakage in service.

The components of the coupling are so constructed that the end of the tube cannot be pinched, weakened or otherwise damaged in fastening it to the coupling, and inadvertent damage to the connection by overtightening the clamping nut is effectively prevented. The tube may be disconnected and re-connected as many times as desired without damage to the tube or coupling.

Figure 4:
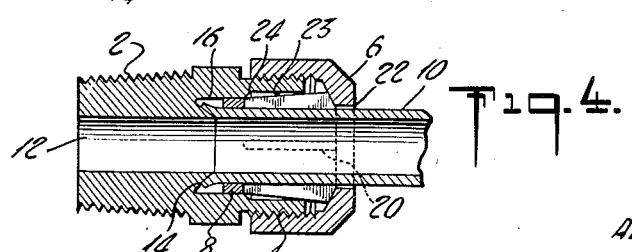
Fig. 4 is a view corresponding to Fig. 1 of a modified form.

In the modification shown in Fig. 4, instead of the outward flaring of the interior surface of the sleeve 4 being of a uniform taper as shown in the preceding views it is formed by a cylindrical bore 23 having the inner end 24 thereof tapered inwardly to the inner cylindrical surface 16. With this construction the engagement of the outer portion of the sleeve with the collar is confined to the extreme outer end of the sleeve. This construction may be found cheaper to manufacture in certain instances.

The form shown in Figs. 5, 6 and 7 is particularly adapted for use in connecting relatively hard or thick walled tubes without flaring. This coupling is provided with a body member 26 having a sleeve 28 formed at one end, a clamping nut 30 screw-threaded to the end of the sleeve, and a collar 32, Fig. 5, showing the parts of the coupling assembled and fastened to a tube 34.

The end portion of the body member 26 opposite the sleeve 28 is provided with an axial bore 36 of substantially the same diameter as the internal diameter of the tube 34. At the inner end of this bore 36, there is a shoulder 38. The inner end of the interior surface of the sleeve 28 is provided with a tube end fitting in the form of a cylindrical socket 40. Adjoining this surface is a conical or outwardly flaring surface 42 which adjoins another outwardly flaring surface 44, the surface 44 flaring to a less degree than the intermediate surface 42.

The collar 32 has an inner end portion 46 which has both its interior and exterior surfaces substantially cylindrical, its interior surface being of slightly greater diameter than the interior surface of the remaining portion of the collar. Said remaining portion of the collar is provided with longitudinal slots 48, and the outer surface thereof is tapered. The outer end of the collar 32 abuts against the end wall of clamping nut 30.

With the parts assembled as shown in Fig. 6, the tube 34 is inserted through the aperture in the end wall of the nut 30 and through the collar 32 with its end abutting the shoulder 38 at the bottom of the sleeve 28.

Upon tightening the clamping nut 30, the collar 32 is forced inwardly, and as the inner end of the collar rides on the tapering portion 42 of the sleeve it is deflected in against the tube and during its continued movement cuts into the tube as shown in Fig. 5. During the continued tightening of the nut 30, the tapered surface of the contractible slotted collar by engagement with the interior surface 44 of the sleeve 28, causes said portion of the collar throughout its length to tightly embrace the tube 34. Also, such engagement of said tapered surface of the collar with the sleeve effectively serves as a stop to limit the inward movement of the collar and thus limits the extent of the cutting of the end of the collar into the tube 34.

It will be apparent that with this construction also, the coupling components are assembled when manufactured and need not be dismantled before being installed.

The tube to be connected may be freely inserted through the aperture in the end wall of the nut, through the split collar, into the tube end fitting and against the shoulder 38, and it is fastened so as to establish a secure leak-proof joint by tightening the clamping nut. When the nut has been completely tightened, the split portion of the collar firmly embraces the tube over a considerable area, the pressure between the tube and the collar gradually diminishing in an outward direction from the inner end of the collar. The spreading and diminishing of this radial clamping force dampens and distributes vibrations, and thereby protects the tube against fatigue and breakage in service. It also protects the tube end, especially the point where it is scored and the wall thickness is reduced, from surface strains and stresses due to axial loading or bending of the connected tube.

When the exterior tapered surface of the collar comes into contact with the interior surface of the outer end of the sleeve, the wedging action between these parts and the tube stops the inward longitudinal movement of the collar and prevents its deflected inner edge from cutting further into the surface of the tube. Thus a preset means is provided to prevent the end of the tube from being severed or unduly weakened by being scored too deeply or being crushed by excessive pressure by overtightening of the clamping nut.

Also, as in the construction previously described, the tube may be disconnected and re-connected as many times as desired without damaging the tube or coupling or the durability of the leak-proof joint.

In the form shown in Fig. 8 instead of the outer portion of the interior surface of the sleeve 28 being tapered, it is formed cylindrical for ease of manufacture. In this form it will be noted that only the outer end of said portion of the sleeve engages the split collar.

As will be evident to those skilled in the art, my invention permits various modifications without departing from the spirit thereof or the scope of the appended claims.

What is claimed is:

1. In a coupling of the class described, a body member having a sleeve formed at one end, and a tube end fitting formed at the inner end of the sleeve, a clamping nut screw-threaded to the end of the sleeve having an end wall provided with an axial opening, and a collar having its inner end portion extending into said sleeve and its outer end adapted to be engaged by said end wall of the nut, the inner end portion of said collar being substantially cylindrical and the remaining portion of the collar being slotted to increase the resiliency thereof, said parts when thus assembled being adapted to receive a tube with the collar in sliding engagement with the tube and the inner end of the tube positioned against said tube end fitting, said collar and said sleeve having co-engaging portions whereby upon tightening the nut said inner end portion of the collar is contracted so as to clamp the tube and the slotted portion of the collar is then caused to grip the tube, the pressure of said slotted portion of the collar on the tube decreasing from the inner to the outer end of the collar.

2. In a coupling of the class described, a body member having a sleeve formed at one end and the remaining portion of said member having an axial bore leading from the interior of said sleeve, a transverse annular shoulder being provided between the end of said bore and the inner end of said sleeve, a clamping nut screw-threaded to the end of the sleeve having an end wall provided with an axial opening, and a collar with the inner end portion thereof having its interior diameter slightly greater than the interior diameter of the remaining portion of the collar, said remaining portion of the collar being slotted to increase its resiliency, and said collar extending into said sleeve with its outer end arranged to be engaged by said end wall of the nut, said parts when thus assembled being adapted to receive a tube with the collar in sliding engagement with the tube and the inner end of the tube abutting said shoulder, and co-engaging surfaces on the collar and sleeve whereby upon tightening the nut the inner end of the collar is deflected inwardly so as to cut into the wall of said tube and the slotted portion of the collar is then caused to grip the tube.

3. In a coupling of the class described, a body member having a sleeve at one end and an annular shoulder at the inner end of the interior of the sleeve, a clamping nut screw-threaded to the outer end of the sleeve having an end wall provided with an axial opening, and a collar having a substantially cylindrical inner end portion with the remaining portion of the collar slotted to increase the resiliency thereof, the exterior surface of said slotted portion of the collar flaring outwardly, said parts when thus assembled being adapted to receive a tube with the collar in sliding engagement with the tube and the inner end of the tube abutting said shoulder, and co-engaging surfaces on the collar and sleeve whereby upon tightening the clamping nut the inner end of the collar is caused to cut into the tube and then by engagement of said flared surface of the collar with the interior surface of the sleeve the slotted portion of the collar is caused to grip the tube.

4. In a coupling of the class described, a body member having a sleeve formed at one end and an annular transverse shoulder at the inner end of the interior of the sleeve, a clamping nut screw-threaded to the end of the sleeve having an end wall provided with an axial opening, and a collar having the interior diameter of its inner end portion slightly greater than the interior diameter of the remaining portion of the collar, said remaining portion of the collar being slotted to increase the resiliency thereof and having its exterior surface flared outwardly, the interior surface of the sleeve having an outwardly flared portion near its inner end and the remaining outer portion of the interior surface of the sleeve being flared outwardly to a lesser degree than said first-mentioned flared portion, the inner end of the collar engaging the outer boundary of said first-mentioned flared portion, and the outer end of said collar being adapted to be engaged by said end wall of said nut, said parts when thus assembled being adapted to receive a tube with the collar in sliding engagement with the tube, and the inner end of the tube abutting said annular shoulder, whereby upon tightening the nut the inner edge of the collar is first caused to ride on said first-mentioned flared portion of the sleeve and then to be deflected and forced into the material of said tube, and then said slotted portion of the collar is caused to grip the tube by engagement of its said outwardly flared surface with the second-mentioned outwardly flared portion of said sleeve.

5. In a coupling of the class described, a body member having a sleeve formed at one end, and a tube end fitting formed at the inner end of the sleeve, a clamping nut screw-threaded to the end of the sleeve having an end wall provided with an axial opening, and a collar having its inner end portion extending into said sleeve and its outer end adapted to be engaged by said end wall of the nut, the inner end portion of said collar being substantially cylindrical and the remaining portion of the collar being flared outwardly, said parts when thus assembled being adapted to receive a tube with the collar in sliding engagement with the tube and the inner end of the tube positioned against said tube end fitting, said collar and said sleeve having co-engaging portions whereby upon tightening the nut said inner end portion of the collar is contracted so as to clamp the tube and the said flared portion of the collar is then caused to engage the outer end portion of the sleeve.

6. In a coupling of the class described, a body member provided with a sleeve at one end having a reduced inner end portion forming a socket, and a conical tube end fitting at the bottom of the socket, a collar having a reduced inner end portion slightly larger in diameter than the diameter of said socket adapted to be forced into the socket so as to be contracted thereby, and a clamping nut screw-threaded to the end of said sleeve having an end wall for engagement with the outer end of the collar, said end wall having an axial aperture to permit a tube to be passed therethrough and through said collar with its inner end in abutting engagement with said tube end fitting, whereby upon tightening said nut the collar is moved inwardly to cause its end to enter said socket so as to clamp the tube and then to force the tube inwardly therewith to cause the end of the tube to be flared over said tube end fitting, the outer portions of the collar and sleeve having surfaces which engage to limit the inward movement of the collar when the end of the tube is flared over said fitting a predetermined extent.

7. A coupling according to claim 6 in which the socket in said sleeve and the reduced inner end of the collar are substantially cylindrical and of such relative diameters that when the collar is forced into said socket so as to be contracted thereby it is caused to clamp said tube without materially contracting the tube.

8. A coupling according to claim 6 in which the outer portion of the collar is longitudinally slotted to permit it to be contracted to grip the tube, the outer end of said collar and the end wall of the nut having coengaging beveled surfaces serving during tightening of the nut to thus contract said slotted portion of the collar, and the exterior surface of the slotted portion of the collar flaring outwardly and by engagement with the outer portion of the sleeve tending to further contract the collar and then to limit the inward movement thereof when the tube is flared over said fitting.

9. A coupling according to claim 6 in which the socket in said sleeve and the reduced inner end of the collar are substantially cylindrical, opposed surfaces of the outer portions of said sleeve and said collar flare outwardly correspondingly, and said outer portion of the collar has longitudinally extending slots to permit said portion to be contracted to grip the tube, and the outer end of said collar and the end wall of said nut having coengaging beveled surfaces serving during tightening of the nut to thus contract said slotted portion of the collar, said flaring surfaces of the sleeve and the collar engaging to cause the collar to grip the tube with increased pressure and to limit the inward movement of the collar when the end of the tube is flared over said fitting, the gripping pressure of the collar on the tube decreasing from its inner toward its outer end.

ALBERT W. MILLER.

REFERENCES CITED

The following references are of record in the file of this patent:

UNITED STATES PATENTS

| Number | Name | Date |
|---|---|---|
| 2,271,502 | Snyder | Jan. 27, 1942 |
| 2,453,024 | Lomelind | Nov. 2, 1948 |
| 2,453,127 | Guarnaschelli | Nov. 9, 1948 |
| 2,466,057 | Somma | Apr. 5, 1949 |

FOREIGN PATENTS

| Number | Country | Date |
|---|---|---|
| 729,401 | France | July 23, 1932 |